United States Patent [19]

Schneider et al.

[11] Patent Number: 5,280,149
[45] Date of Patent: Jan. 18, 1994

[54] PROCESS FOR TREATING HIGHLY ENVIRONMENTALLY POLLUTING RESIDUES

[75] Inventors: Michel Schneider; Gérard Masson, both of Dunkerque; Eric Bescher, Guidel, all of France

[73] Assignee: Sollac, Puteaux, France

[21] Appl. No.: 921,690

[22] Filed: Jul. 30, 1992

[30] Foreign Application Priority Data

Aug. 7, 1991 [FR] France .................. 91 10073

[51] Int. Cl.$^5$ .................................. H05B 6/64
[52] U.S. Cl. ........................ 219/10.55 M; 588/256; 588/237
[58] Field of Search ............ 588/219, 237, 256, 257; 204/157.3; 219/10.55

[56] References Cited

U.S. PATENT DOCUMENTS 4,963,709 10/1990 Kimrey, Jr. ............ 219/10.55 M

FOREIGN PATENT DOCUMENTS 2218389 9/1974 France .
2477181 9/1981 France .
2081060 2/1982 United Kingdom .

Primary Examiner—Donald R. Valentine
Assistant Examiner—Cybille Delacroix-Muirheid
Attorney, Agent, or Firm—Oblon, Spivak, McClelland, Maier & Neustadt

[57] ABSTRACT

The subject of the present invention is a process for treating highly environmentally polluting residues such as for example residues derived from dry or wet filtration. The process consists in mixing the residues with a product containing iron oxide, in placing the mixture in a crucible, in protecting the crucible with insulating fibers, in putting the crucible in a microwave oven and in exposing the mixture to microwaves for a time of between 2 and 15 minutes at a temperature of between 1000° and 1300° C. in order to produce a dry fusion of the mixture and to obtain a solid material. The present invention is applicable to the reclaiming of sludge from the iron and steel industry.

7 Claims, 1 Drawing Sheet

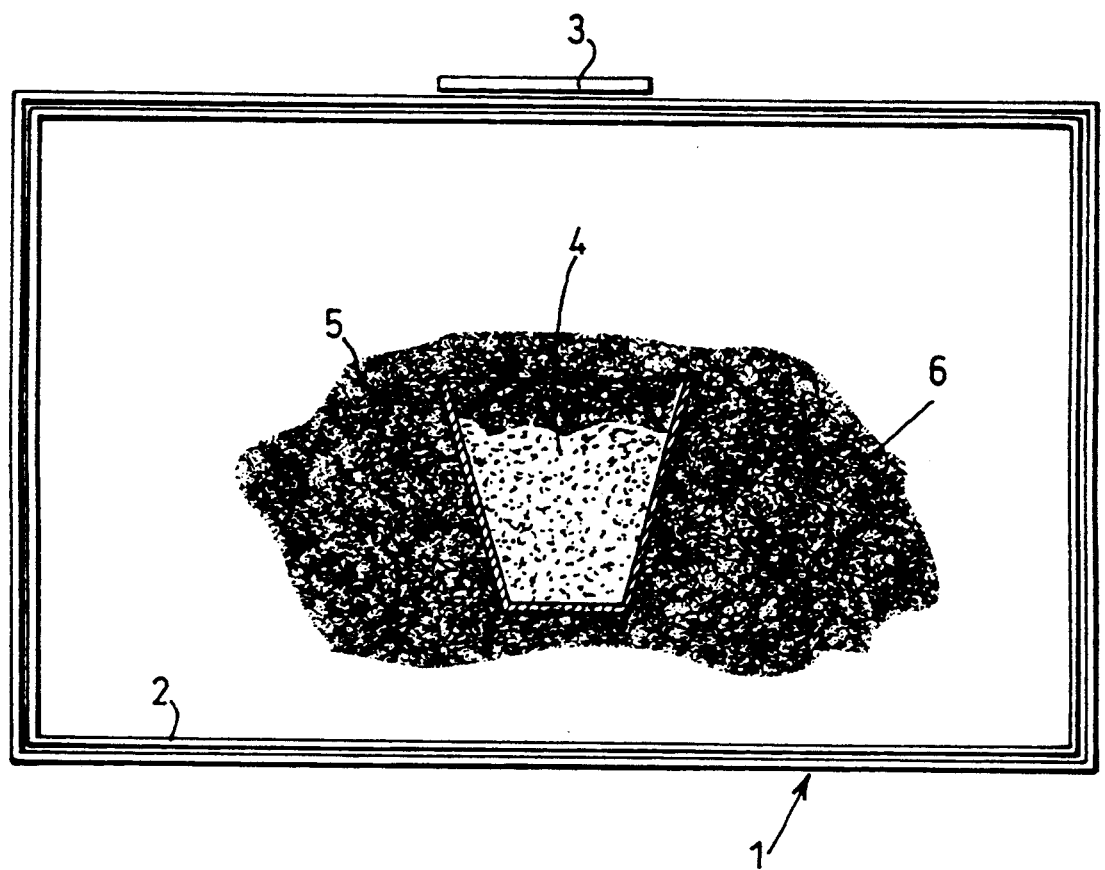

PROCESS FOR TREATING HIGHLY ENVIRONMENTALLY POLLUTING RESIDUES

BACKGROUND OF THE INVENTION

1. Field of the Invention

The subject of the present invention is a process for treating residues which are highly environmentally polluting via water, such as for example residues derived from dry or wet filtration.

The highly polluting residues targeted by the treatment process according to the present Application, are in particular sludge from metal production, sludge from decanters in mechanical engineering factories or iron and steel works, sludge from factory networks or from urban networks or also fines derived from dry or wet filtration of the fumes from coal-fired power stations or from industrial incinerators.

This type of residue contains particularly environmentally dangerous products.

In fact leaching tests carried out on these residues reveal that they contain products such as zinc, lead or cadmium which are highly polluting for the groundwater table when these residues come into contact with water.

2. Discussion of the Prior Art

Hitherto, several methods have been used to treat these residues which consist either in carrying out calcining of the residues at a temperature of the order of 1500° C., or in packing the residues in order to store them in a hermetic enclosure or in absorbing the said residues by resins in order to avoid contact with water and air.

But these various methods are not economically profitable because, in the one case they require large energy consumption and in the other case they need refined and costly products of the noble resin, adhesive or special packaging type.

SUMMARY OF THE INVENTION

The aim of the present invention is to propose a treatment process which avoids the drawbacks mentioned above.

The subject of the present invention is therefore a process for treating highly environmentally polluting residues such as, for example, residues derived from dry or wet filtration, characterized in that it consists:

in mixing the residues with a product containing iron oxide;

in placing the mixture in a crucible;

in protecting the crucible with insulating fibers;

in placing the crucible protected with the insulating fibers a microwave oven;

and in exposing the mixture to microwaves for a time of between 2 to 15 minutes at a temperature of between 1000° C. and 1300° C. in order to produce a dry fusion of the mixture and to obtain a solid material.

According to other characteristics of the invention:

the product mixed with the residues contains 10 to 40% of iron oxide;

the product mixed with the residues is formed by magnetite or by sludge from the iron and steel industry;

the temperature of exposure to microwaves of the mixture is preferably equal to 1100° C.;

the insulating fibers are formed by aluminosilicate fibers; and the microwave oven operates at 2.45 GHz and at a power of 700 W.

The treatment process mentioned hereinabove is most particularly applicable to the reclaiming of sludge from the iron and steel industry.

BRIEF DESCRIPTION OF THE DRAWINGS

Other characteristics and advantages of the invention will appear on reading the description which is to follow, which description is given only by way of and is made with reference to the single attached figure which represents a diagram of a microwave oven for implementing the treatment process according to the present invention.

DESCRIPTION OF THE PREFERRED EMBODIMENTS

The figure schematically represents a microwave oven 1 which comprises in the conventional way, a multimode cavity and an ultrahigh frequency wave generator 3.

This microwave oven operates for example at 2.45 GHz and at a power of 700 W.

The process according to the present invention consists in treating residues which are highly environmentally polluting via water, like for example residues derived from dry or wet filtration.

These residues are in particular sludge from the production of metals and copper, aluminium, zinc, sludge from decanters in mechanical engineering factories or iron and steel works, sludge from factory networks or from urban networks or also fines derived from dry or wet filtration of the fumes from coal-fired power stations or from industrial incinerators.

The treatment process consists first in mixing the highly polluting residues with a product containing iron oxide, in particular in a proportion between 10 and 40%.

This product is formed for example by magnetite or sludge from the iron and steel industry.

The mixture 4 thus obtained is placed in a crucible 5 and this crucible 5 containing the mixture 4 is protected with insulating fibers 6 like, for example, aluminosilicate fibers.

Next, the crucible 5 and the mixture 4 protected with the insulating fibers 6 are placed in the microwave oven 1 and the mixture 4 is exposed to microwaves for a time of between 2 to 15 minutes at a temperature of between 1000° and 1300° C. and preferably equal to 1100° C. in order to produce a dry fusion of the said mixture and to obtain a solid material.

Any other protection of the crucible and of the mixture can also be used.

During the exposure of the mixture in the microwave oven, absorption of the microwaves brings about adhesion of the various constituents and the iron contained in the form of iron oxide in one of the constituents acts as a dry binder at 1100° C. for all the constituents.

Leaching tests have been carried out on the material obtained and these tests show that the material is a thousand times less dangerous than the untreated residues.

The material obtained can have an aggregate type form or a tile form and the use of this material conforms to the pollution standards currently in force.

This treatment process finds is particularly applicable to the reclaiming of sludge from the iron and steel industry by using its heating properties when passing into the microwave oven.

In addition, the dry fusion is carried out between 1000° C. and 1300° C. instead of the 1500° C. necessary in the case of conventional calcining, resulting in a well-acknowledged energy gain.

Another application of this treatment process is the mixing of ash from industrial incinerators with sludge from the iron and steel industry, which makes possible the manufacture of tiles.

Thus, the use of two unusable wastes makes it possible to obtain an environmentally acceptable and above all exploitable product.

In general, the material obtained by the process according to the present invention has particularly favorable mechanical properties, which makes possible a whole series of applications for its use, for example in road engineering, building and public works.

Finally, the process according to the present invention enables an energy gain to be made and avoids the use of refined products of the noble resin, adhesive or special packing type.

We claim:

1. A process for treating highly environmentally polluting residues, such as residues derived from dry or wet filtration, comprising the steps of:

mixing polluting residues with a product containing iron oxide;
   placing the mixture in a crucible;
   protecting the crucible with insulating fibers;
   placing the crucible protected with the insulating fibers in a microwave oven; and
   exposing the mixture to microwaves for a time of between 2 to 15 minutes at a temperature of between 1000° C. and 1300° C. for producing a dry fusion of the mixture and obtaining a solid material.

2. The process according to claim 1, wherein the product mixed with the residues contains 10 to 40% of iron oxide.

3. The process according to claim 1 or 2, wherein the product mixed with the residues is formed by magnetite.

4. The process according to claim 1 or 2, wherein the product mixed with the residues is formed by sludge from iron and steel works.

5. The process according to claim 1, wherein the temperature of exposure to microwaves of said mixture is preferably equal to 1100° C.

6. The process according to claim 1, wherein the insulating fibers are formed by alumino-silicate fibers.

7. The process according to claim 1, wherein the microwave oven operates at 2.45 GHz and at a power of 700 W.

* * * * *